Feb. 17, 1931. R. E. STOLL 1,792,718

BELT SPLICE

Filed March 2, 1928

Inventor
R. E. Stoll
by
Attorney

Patented Feb. 17, 1931

1,792,718

UNITED STATES PATENT OFFICE

ROBERT E. STOLL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

BELT SPLICE

Application filed March 2, 1928. Serial No. 258,658.

The present invention relates in general to improvements in the art of splicing power transmission bands or belts in order to provide for continuity in the structure thereof.

An object of the invention is to provide a simple and effective splice for producing a comparatively inseparable union between the adjacent ends of a transmission belt or the like. Another object of the invention is to provide a belt splice especially applicable to V-belts, which is capable of effectively withstanding considerable tension and lateral flexing, without destruction. A further object of the invention is to provide a splice which is especially adapted for application to non-metallic driving belts, which may be readily applied without the use of special equipment. Still another object of the invention is to provide a new and useful splice for laterally compressible side driving belts, which will not interfere with the normal operation of the belt. These and other objects and advantages resulting from the use of the present improvement, will be apparent from the following description.

A clear conception of a number of embodiments of the invention and of the manner of applying splices in accordance therewith, may be had by referring to the drawing accompanying and forming a part of this specification in which like reference characters designate similar elements in the various views.

Figure 1:
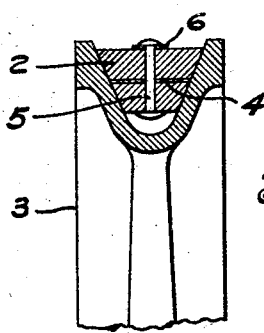
Fig. 1 is a transverse sectional view through the rim of a driving sheave and through the spliced portion of a V-belt coacting with the groove of the sheave.

Referring specifically to Fig. 1, the endless V-belt 2 is of trapezoidal cross-section being provided with tapered opposite side driving surfaces which during normal operation of the drive, cooperate with the sides of a V-groove formed in the periphery of a transmission sheave 3. The V-belts 2 are preferably formed of rubber composition, but may be formed of other relatively elastic and flexible materials.

Figure 2:
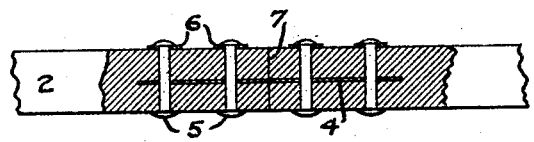
Fig. 2 is a part sectional side view of the spliced portion of a V-belt, showing one type of the improved splice.
Figure 3:
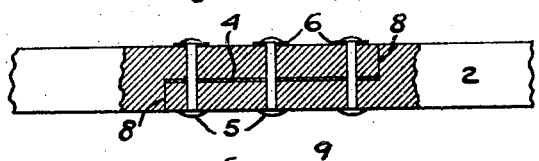
Fig. 3 is a part sectional side view of the spliced portion of a V-belt, showing another type of the improved splice.

In the specific embodiment of the invention disclosed in Fig. 2, the belt 2 is provided with abutting end surfaces 7 and the pitch line of the belt is disposed approximately midway between the outer and inner portions of the belt. The belt ends are slitted substantially in the plane of the pitch line and a ribbon 4 of metal or other material having relatively high tensile strength, is inserted within the end slits. Rivets 5 may be passed through alined openings formed in the ribbon 4 and in the adjacent belt ends, and the ends of these rivets may be peened over washers 6 which embrace the protruding rivet ends. The ribbon 4 is preferably of less width than the belt 2, measured at the pitch line, in order to permit lateral compression of the belt at the splice without interference by the ribbon 4. The ribbon 4 should be formed of material such as spring steel which is highly flexible, in order to retain the proper degree of lateral flexibility in the belt 2 so as to enable the same to effectively coact with sheaves 3 of relatively small diameter. In the embodiment of the invention disclosed in Fig. 3, the belt 2 is provided with overlapping end portions having abutting end surfaces 8, the pitch line of the belt being disposed substantially in the plane separating the adjacent overlapping portions. A ribbon 4 of metal or other material having relatively high tensile strength, is inserted between the overlapping end portions of the belt 2. Rivets 5 are inserted through alined openings formed in the ribbon 4 and in the overlapping portions of the belt ends, and the outer ends of these rivets are provided with washers 6, being peened over the washers to rigidly unite the coacting parts. The ribbon 4 is preferably of less width than the lateral thickness of the belt 2 measured at the pitch line, in order to permit lateral compression of the belt at the splice without interference by the ribbon 4. The ribbon 4 of this embodiment is also formed of material which is highly flexible in order to retain sufficient lateral flexibility in the belt 2 whereby the belt may effectively coact with sheaves 3 of relatively small diameter.

Figure 4:
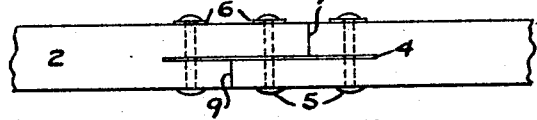
Fig. 4 is a side view of the spliced portion of a V-belt showing still another form of the improved splice.

In the embodiment of the invention illustrated in Fig. 4, the belt is provided with comparatively short overlapping end portions having abutting end surfaces 9, and is also provided with slits extending longitudinally of the belt beyond the surfaces 9. A ribbon 4 of metal or other material having relatively high tensile strength, is inserted within the slits and between the overlapping end portions of the belt 2. Rivets 5 are caused to coact with alined openings formed in the ribbon 4 on opposite sides of the surfaces 9, and in the adjacent belt ends, and these rivets are peened over washers 6 embracing the protruding ends thereof. As in the previously described embodiments of the invention, the ribbon 4 is preferably of less width than the belt 2 measured at the pitch line where the ribbon is located, and the ribbon 4 is formed of relatively flexible material in order to permit proper flexure of the belt during normal operation.

Figure 5:
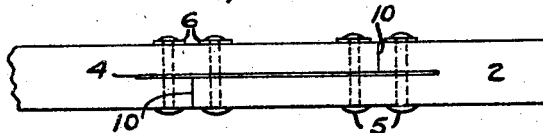
Fig. 5 is a side view of the spliced portion of a V-belt showing a further modification of the improved splice.

In the embodiment of the invention illustrated in Fig. 5, the belt 2 is provided with comparatively long overlapping end portions having abutting end surfaces 10, and with slits extending longitudinally of the belt beyond the surfaces 10. A ribbon of relatively flexible metal or other material having comparatively high tensile strength, is inserted between the overlapping end portions of the belt and within the slits, preferably at the pitch line of the belt. The ribbon 4 and the belt ends are united by means of rivets 5 and washers 6, and the ribbon 4 is preferably of less width than the belt adjoining the place of embedment of the ribbon, in order to permit the necessary lateral compression of the belt at the splice without interference by the ribbon 4.

Figure 6:
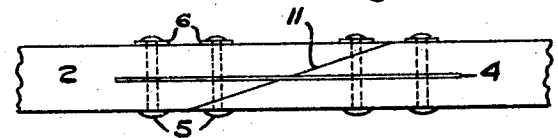
Fig. 6 is a side view of the spliced portion of a V-belt showing still another modification of the improved splice.

In the embodiment of the invention disclosed in Fig. 6, the belt is provided with diagonally extending abutting end surfaces 11, and with slits extending longitudinally thereof and crossing the surfaces 11 approximately at the pitch line of the belt. A laterally flexible ribbon 4 of metal or other material having relatively high tensile strength, is inserted within the slits and is secured to the belt ends which are also secured directly to each other, by means of rivets 5 and washers 6. As in the previously described embodiments, the ribbon 4 is preferably of less width than the belt 2 measured across the pitch line, in order to permit lateral compression of the belt at the splice without interference by the ribbon 4.

Figure 7:
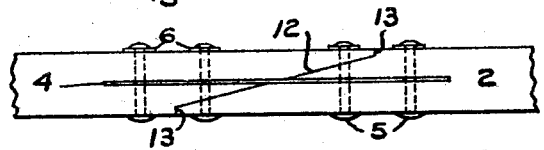
Fig. 7 is a side view of the spliced portion of a V-belt showing another form of the improved splice.

In the embodiment of the invention disclosed in Fig. 7, the belt 2 is provided with abutting diagonal end surfaces 12 and parallel end surfaces 13, thus avoiding thin edge portions such as produced by diagonal cutting only. The ends of the belt of Fig. 7 are provided with slits extending longitudinally thereof at the pitch line, and a metal ribbon 4 is inserted in the slits and is secured to the ends of the belt 2 which are also secured to each other, by means of rivets 5 and washers 6. As in the previously described cases, the ribbon 4 is laterally flexible and of less width than the belt at the pitch line.

Figure 8:
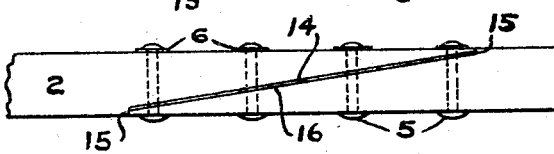
Fig. 8 is a side view of the spliced portion of a V-belt showing still another modification of the improved splice.

In the embodiment illustrated in Fig. 8, the ends of the belt are provided with diagonal adjacent surfaces 16 and with parallel end abutting surfaces 15 extending perpendicular to the belt. A flexible ribbon 14 of metal or other material having relatively high tensile strength, is inserted between the surfaces 16, and the belt ends and the ribbon 14 are rigidly united by means of rivets 5 and washers 6. As in the previous embodiments the ribbon 14 is formed of highly flexible material and is of less width than the adjacent portions of the belt.

Figure 9:
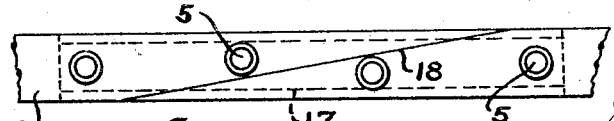
Fig. 9 is a top view of the spliced portion of a transmission belt showing still another modification of the improved splice.

In the specific embodiment of the invention disclosed in Fig. 9, the belt is cut diagonally from one side driving surface to the other and a ribbon 17 of metal or other material having relatively high tensile strength is inserted within slits formed in the belt and extending longitudinally past the tapered end surfaces 18 thereof. The parts are again united by means of rivets 5 and washers 6 in an obvious manner and the ribbon 17 is of less width than the thickness of the belt at the pitch line where the ribbon is preferably embedded in the belt. The ribbon 17 is also preferably formed of highly flexible material to permit free flexure of the belt at the splice.

It will be apparent that in each of the embodiments illustrated, the belt is provided with a splice capable of withstanding considerable tension and lateral flexure, by virtue of the characteristics of the flexible ribbon utilized to form the union. The splice is especially adapted for application to nonmetallic driving belts and may be readily applied with the aid of ordinary tools such as a knife for cutting and slitting the belt ends, a drill for forming the rivet holes, and a hammer for effecting peening of the rivets. The metallic ribbon may be made of sufficient strength to insure at least as great strength in the belt at the splice, as is possessed by portions of the belt beyond the splice. By forming the ribbon of less width than the belt and by locating the same at the pitch line, proper flexure of the belt is assured and lateral compression thereof is permitted without interference by the ribbon.

It should be understood that it is not desired to limit the invention to the exact details of construction herein shown and described for various modifications within the scope of the claims may occur to persons skilled in the art.

It is claimed and desired to secure by Letters Patent:

1. An article of manufacturing comprising a continuous power transmission belt deflectable in the plane of continuity thereof and having a splice consisting of overlapping opposite ends interconnected by an intervening flexible ribbon of material having relatively high tensile strength and with an intermediate portion of said ribbon held between said overlapping belt ends and end portions of said ribbon extending beyond said overlapping bent ends and into the adjacent body portions of said belt, said connecting ribbon being freely deflectable in said plane, and said belt being of substantially the same cross-sectional area at said splice as at other portions thereof.

2. An article of manufacture comprising a continuous power transmission belt freely deflectable in the plane of continuity thereof and having a splice consisting of overlapping opposite ends interconnected by an intervening flexible ribbon of material having relatively high tensile strength, said connecting ribbon being embedded in and at the pitch line of the belt with its end portions embedded in and secured to non-overlapping portions of said belt ends and being freely deflectable inwardly and outwardly with the adjacent portions of said belt, and said belt being of substantially the same transverse cross-sectional area at said splice as at other portions thereof.

3. An article of manufacture comprising a continuous power transmission belt formed of rubber composition and deflectable in the plane of continuity thereof and having a splice consisting of overlapping opposite ends interconnected by a flexible metal ribbon having relatively high tensile strength, said connecting ribbon being embedded in and at the pitch line of the belt with the ends of the ribbon entering into non-overlapping portions of the belt ends, and having fastening means for securing an intermediate portion of said ribbon to the overlapping portions of the belt ends and for securing each end of said ribbon to a non-overlapping portion of the belt end in which it is embedded, and said ribbon being freely deflectable inwardly and outwardly with the adjacent portions of said belt, and said belt being of substantially the same transverse cross-sectional area at said splice as at other portions thereof.

4. An article of manufacture comprising a V-belt formed of rubber composition and having side driving surfaces directed toward a common line of intersection, said belt having a splice consisting of overlapping opposite ends interconnected by a flexible metallic ribbon of relatively high tensile strength and deflectable toward said line of intersection and embedded in the belt at the pitch line thereof with the end portions of said ribbon entering into and secured to the adjacent body portions of said belt beyond the overlapping ends thereof, and said belt being of substantially the same transverse cross-sectional area at said splice as at other portions thereof.

5. An article of manufacture comprising a V-belt formed of rubber composition and having side driving surfaces, the opposite ends of said belt overlapping and being interconnected to form a splice by a flexible metal ribbon embedded in the belt at the pitch line thereof, with the ends of said ribbon extending beyond the overlapping belt ends and embedded in the adjacent body portions of said belt, and said ribbon being freely deflectable inwardly and outwardly with the adjacent portions of the belt and being of less width than said belt at said pitch line measured between said surfaces, said belt being of substantially the same transverse cross-sectional area at said splice as at other portions thereof.

6. An article of manufacture comprising a continuous V-belt having relatively approaching side driving surfaces and having overlapping opposite ends, said ends being interconnected to form a splice by a flexible metallic ribbon coacting with the overlapping portions of said belt ends and having an intermediate portion fastened to both of the overlapping portions of the belt ends and end portions each of which is fastened to the body portion of said belt beyond the overlapping end thereof, and said ribbon being freely deflectable inwardly and outwardly to conform to changes in the direction of the pitch line of said belt during operation thereof and being of less width than the adjacent portion of said belt measured between said surfaces and at pitch line, and said belt being of substantially the same transverse cross-sectional area at said splice as at other portions thereof.

In testimony whereof, the signature of the inventor is affixed hereto.

ROBERT E. STOLL,